Sept. 8, 1942.    E. TOPANELIAN, JR    2,295,139
FLEXIBLE BEARING
Filed June 19, 1940    2 Sheets-Sheet 1
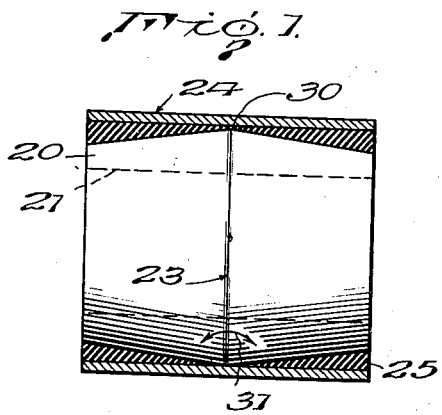
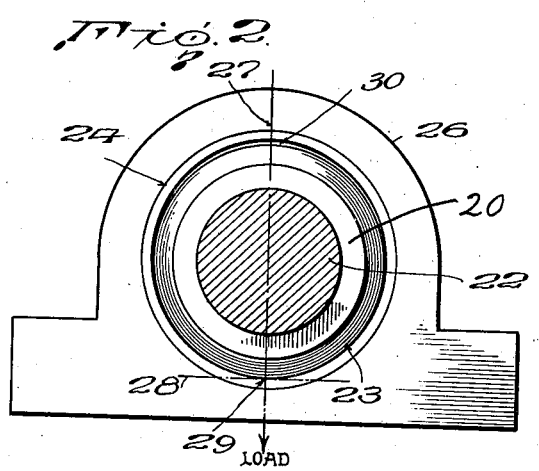
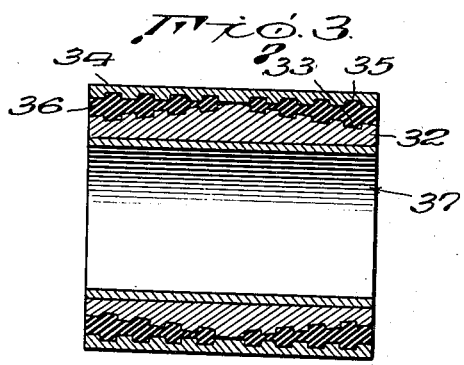
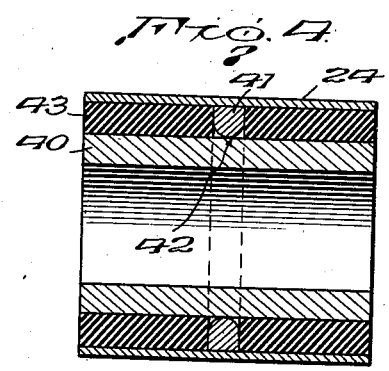
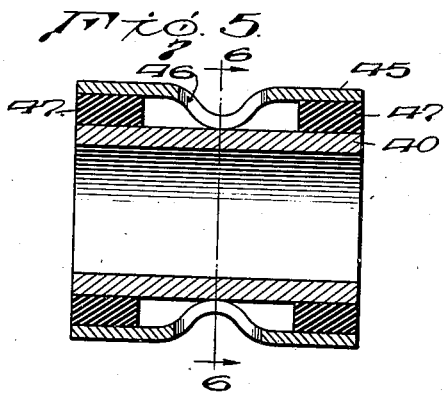
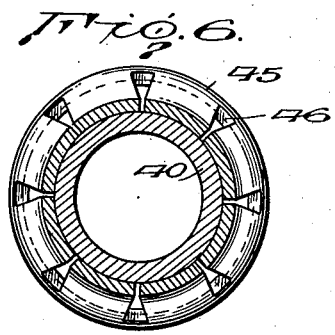
Inventor
E. Topanelian, Jr.,
By A. M. Houghlin
his Attorney

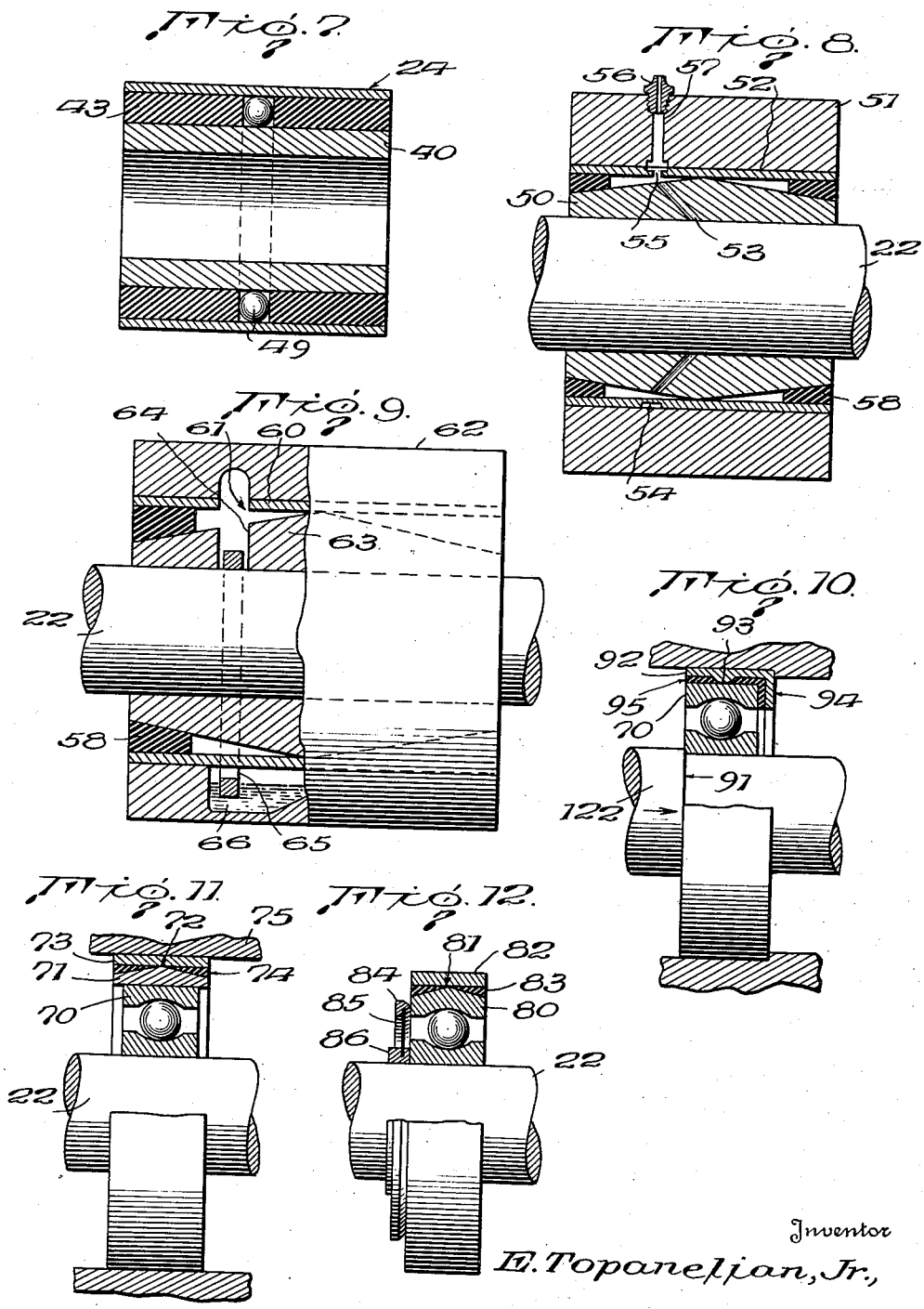

Patented Sept. 8, 1942

2,295,139

UNITED STATES PATENT OFFICE 2,295,139

FLEXIBLE BEARING

Edward Topanelian, Jr., Verona, Pa., assignor to Gulf Research & Development Company, Pittsburgh, Pa., a corporation of Delaware Application June 19, 1940, Serial No. 341,376

8 Claims. (Cl. 308—26)

This invention or discovery relates to flexible bearings; and it comprises a flexible or self-aligning bearing including an annular bearing member, a support member surrounding the bearing member, annular fulcrum means within the support member for supporting the bearing member for rocking movement with respect to the support member, and elastic sealing material secured between said members; all as more fully hereinafter set forth and as claimed.

Among the objects of the present invention are the provision of a simple compact self-aligning or flexible bearing adapted to compensate for shaft misalignment while preventing lateral shaft deflection, the provision of a flexible bearing effectively sealed against passage of fluids, and the provision of a flexible bearing making use of rubber-like elastic sealing means while providing a solid metal-to-metal support for the load-carrying parts of the bearing.

There is a need in many kinds of machinery for flexible or self-aligning sleeve bearings, that is sleeve bearings which will adjust themselves to misalignment of shafting, temporary or permanent. Misalignment of bearings results in uneven distribution of the lubricating film, with the possibility of metal-to-metal contact, accompanied by rapid wear, noise and vibration. Liability to misalignment is prevalent in many types of small machinery, because of the way the parts are assembled. For example some electric motor housings comprise a front shell and a rear shell, each containing a bearing, these being bolted together with the armature inside. Alignment in such case depends on accurate machining of the bearings and also on accurate centering of the shells while bolting them together. Furthermore in such light machinery, even if alignment is perfect at first, if the framework, etc. gets bumped or bent true alignment may be destroyed. Self-alignment can be provided by pivotal bearing supports or the like, where there is plenty of room available, but such expedients are not very practical in small machinery such as fans, household appliances, etc. Spherical seated bearings are simple but are subject to sticking at the seat, it being difficult to lubricate surfaces which reciprocate, rather than rotate, with respect to each other. For some special installations resilient bearings find some use; bearings consisting essentially of a tubular bearing shell surrounded by a concentric rubber tube which in turn is supported by a tubular housing of some sort. But such expedients are impractical where accurate shaft spacing must be provided, as in gearing. They allow the shaft to displace laterally under load to an extent proportional to the load.

According to the present invention there is provided a flexible bearing which accommodates itself readily to misalignment of shafting, but which at the same time is or can be almost as compact as the simplest form of rigid bearing, and which moreover solidly supports the shafting against lateral displacement. These advantages are achieved by a construction comprising a bearing member and a concentric supporting sleeve arranged to support the bearing member fulcrum-wise, for rocking movement with respect to the sleeve, and a filling of resilient plastic material bonding the parts together and preventing displacement. The bearing member can have an enlarged annular waist, of diameter slightly smaller than the tube and adapted to rock on the inner wall of the tube. Or if desired the supporting tube can have a constricted waist on which the bearing member proper rocks; or separate intermediate fulcrum means can be provided to achieve a similar object. In all embodiments, the plastic material plays an important structural part in the bearings; it holds the parts in correct relation.

In the accompanying drawings, I have shown more or less diagrammatically, several examples of specific embodiments of apparatus within the purview of the invention. In the drawings, Fig. 1 is a view partly in central vertical section and partly in side elevation of one form of bearing;

Fig. 2 is a view in end elevation of the bearing of Fig. 1 as installed and in use;

Fig. 3 is a view partly in central section and partly in elevation of a modification of the form of Fig. 1;

Fig. 4 is a view in central vertical section of a modified form of bearing in which the fulcrum takes the form of an annulus mounted in the supporting tube;

Fig. 5 is a view in central vertical section of a modification of the structure of Fig. 4 with a fulcrum integral with the supporting tube;

Fig. 6 is a sectional view taken along line 6—6 of Fig. 5;

Fig. 7 is a view in central vertical section of another modification utilizing a ring of balls as a fulcrum means;

Figs. 8 and 9 are views in central vertical section showing two ways of lubricating bearings according to the invention; and Figs. 10, 11 and 12 are views partly in section and partly in elevation showing the invention applied to anti-friction bearings.

Referring to the drawings, and more particularly to Figs. 1 and 2, these figures show a simple form of the invention, comprising a sleeve-like bearing bushing 20 having a cylindrical bearing surface 21 adapted to receive a shaft 22. This shell is of a double frusto-conical shape as shown, with an enlarged waist providing a circular peripheral edge at 23, usually slightly rounded off. The shell is mounted within a supporting tube or annulus 24. The fit is a minimum loose fit, to allow a slight rocking of the bushing in the tube without jamming. The space between the bushing and the mount is filled with a suitable resilient plastic composition indicated at 25, conveniently synthetic rubber, bonded cohesively to the tube and to the shell (omitted from Fig. 2). The synthetic rubber bonds the parts of the bearing together in their correct relation. The mount is carried by a suitable stationary support shown as a pillow block 26 (Fig. 2).

In operation upon displacement of the shaft axis, the shell rocks about a point on the inner wall of the mount; or more accurately it rocks about a very narrow short curved line. Fig. 2 illustrates the actions taking place. The direction of load or load axis is indicated at 27. With deflection of the shaft the waist 23 tends to rock through an angle ( arrow 31 in Fig. 1) about an axis 28 intersecting axis 27 at right angles at the point of contact 29 of the waist and the mount. Actually the contact is a very short, narrow area rather than a geometrical point. The clearance between waist 23 and the mount, indicated at 30, is much exaggerated in Figs. 1 and 2 for the sake of clarity. Actually it is but a few thousandths of an inch. If the direction of load changes, the bushing then tends to rock about a new point of contact between the bushing and the shell. In properly constructed machinery the shaft deflections to be accommodated are rarely more than a very few degrees. The action is like that of a knife edge or rolling fulcrum, there being no rubbing of parts. This waist part at least of the bearing is best embodied in a relatively hard material, such as bonze or steel.

The bearing is very compact and is well suited for use in electrical fans and all sorts of machinery where its characteristics are desired. The bearing has the considerable advantage that it is sealed. There are no open spaces through which oil, etc., can leak. This makes it eminently suitable for use in pumps and other devices where a bearing must be arranged to hold a certain amount of fluid pressure depending on the clearance between the shaft and bearing member.

The bearing of Fig. 1 will withstand a moderate amount of end thrust. The bearing can be adapted to withstand greater end thrust by modifying it is shown in Fig. 3. In Fig. 3 the shell 32 has annular grooves 33 and the mount 34 is likewise grooved at 35, so that the resilient filling 36 is locked in place against displacement. Fig. 3 shows the bearing sleeve as lined with a liner 37 of Babbitt metal or the like, as is sometimes desired.

Fig. 4 shows a form of the invention in which the fulcrum is on the mount rather than on the bearing annulus. In Fig. 4 the bearing sleeve 40 is a simple tube. The mounting annulus 24 is like that of Fig. 1, but carries inside a ring 41, push fitted into the mount and having a toroidal inner contour 42 engaging tube 40 but not tightly. Rubber or the like indicated at 43 is bonded to the shell and to the mount. In operation, this bearing operates similarly to that of Fig. 1. The tube rocks about a point on the annulus in the direction of load.

Figs. 5 and 6 show a simplified form of the apparatus of Fig. 4. The mount 45 is slotted at 46 around its periphery and the intervening portions are bent downwardly as shown to form a toroidal bearing surface analogous to that of Fig. 4 supporting the bearing tube 40. Two rubber annuli 47 are bonded between the mount and the sleeve as shown.

In Fig. 7 the mount 24 and bearing shell 40 are like those of Fig. 4 but the fulcrum means takes the form of a set of balls 49, conveniently ball-bearing balls which are held in place with rubber inserts 43.

The bearings can be lubricated in any convenient way. Fig. 8 shows a typical lubrication system. Bearing shell 50 similar to that of Fig. 1 is mounted within a mount 52 which is fitted within a pillow block or other stationary member 51. The shell has a set of perforations 53, for passage of lubricant (not shown). The mount is grooved around its periphery at 54 and perforated through the wall at 55. A lubrication fitting 56 is provided in the pillow block etc. delivering to a passage 57 for injection of grease, etc. into the bearing. Rubber annuli 58 seal the bearing. The bearing proper need not be positioned in any definite annular position with respect to the block, to ensure feeding of grease.

Fig. 9 shows a bearing adapted to oil ring lubrication. The bearing proper comprises a mount 60 slotted at 61 and fitted within a pillow block or the like 62. A bearing shell 63 similar to that in Fig. 1 is mounted within the mount. The shell is slotted at 64 for reception of a ring 65 which dips into an oil reservoir 66 in the block. Sealing annuli 58 are provided as in Fig. 8.

The invention is well adapted for embodiment in antifriction bearings. Referring to Fig. 11 a conventional ball bearing 70 is press fitted within an annulus 71 of double frustoconical shape with a waist 72. The waist engages a mounting annulus 73 and rubber 74 is bonded to the amount and the annulus, as shown. The mount 73 is fitted within some stationary support 75 in a manner similar to ordinary ball bearing practice.

Fig. 12 shows a form of the invention in which the outer race 80 of a ball bearing is made of frustoconical contour with a waist 81, which rocks within a mounting annulus 82. Rubber is bonded to both parts at 83.

These types of bearings can be sealed against fluid pressure if desired in a conventional way, using a sealing ring 84 bearing against the outer race and supported through a thin metal diaphragm 85 from an annulus 86 on the shaft. The bearings can be arranged to take thrust as shown for example in Fig. 10. A bearing 70 supporting a shaft 122 shouldered at 91 is mounted in a mount 92 having a rounded annular fulcrum portion 93 and a flange 94, with interposed synthetic rubber 95 bonded to parts 70 and 92 as shown.

The bearings can be embodied in any suitable material, metallic or non-metallic; e. g. steel bronze, or Bakelite synthetic resin. For the elastic bonding means, rubber itself or various synthetic rubbers and rubber-like plastics are useful, including neoprene (polyprene), Thiokol, Perbunan, etc., these latter being especially advantageous in view of their resistance to oil and heat. It is desirable that the resilient material be cohesively bonded to the mount and to the bearing member, with a bond equal in strength to the tearing strength of the rubber. Several good ways of securing close bonds are known in the art. For example in employing neoprene for the filler, rubber chloride cements are useful as an adhesive. In some cases the filling material is introduced into the space between the bearing and the mount in a raw or uncured state and is vulcanized or heat-treated in place.

What I claim is:

1. In a flexible bearing adapted to support shafting with substantially no sideplay, while permitting bending of the shafting, an annular bearing member adapted for the reception of shafting rotating relative thereto, concentric annular supporting means therefor, made of rigid, unyielding material in annular configuration, spaced from the bearing member a substantial distance except at one zone at which the support means closely surrounds the bearing member along a narrow circular line of very small width in the direction of the axis of the bearing, with clearance sufficient only to permit a limited degree of rocking of the bearing member with respect to the supporting means and so small as to prevent any appreciable sideplay of the bearing member, whereby the bearing member is free to rock at a point on said line but is maintained in concentric relation to the supporting means and is restrained from lateral movement, and elastic sealing material between the bearing member and the supporting means, of such low rigidity as to have but a negligible load carrying function and not to substantially interfere with the rocking of said member.

2. The bearing of claim 1 wherein the supporting means is a cylindrical bored mount, and the bearing member has an enlarged, narrow-edged waist fitting closely in said bore.

3. The bearing of claim 1 wherein the bearing member has a cylindrical periphery and the supporting means is provided with a narrow-edged constricted portion closely surrounding said periphery.

4. The bearing of claim 1 wherein the bearing member has a cylindrical periphery and the supporting means includes an intermediate annulus closely fitting the bearing member.

5. The bearing of claim 1 wherein the bearing member has a cylindrical periphery and the supporting means comprises an annular row of balls closely surrounding and supporting the bearing member.

6. The bearing of claim 1 wherein the elastic sealing material is an oil-resistant synthetic rubber.

7. The bearing of claim 1 wherein the bearing member comprises an antifriction bearing.

8. The bearing of claim 1 wherein the sealing material is in the form of annuli adjacent each end of the bearing member, to define between the annuli a space for reception of lubricant, and the bearing member is perforated through the wall thereof and means are provided for introducing lubricant into said space and through said perforation.

EDWARD TOPANELIAN, JR.